(12) United States Patent
Beaman et al.

(10) Patent No.: US 11,479,943 B2
(45) Date of Patent: Oct. 25, 2022

(54) BUOYANT MECHANICAL LIQUID LEVEL CONTROL

(71) Applicant: Ovivo Inc., Montreal (CA)

(72) Inventors: Tyson Beaman, Murray, UT (US); Garret Beaman, Murray, UT (US); John Vorwaller, Salt Lake City, UT (US); Tyler Thomas, Salt Lake City, UT (US)

(73) Assignee: Ovivo Inc., Montreal (CA)

( * ) Notice: Subject to any disclaimer, the term of this patent is extended or adjusted under 35 U.S.C. 154(b) by 0 days.

(21) Appl. No.: 17/280,771

(22) PCT Filed: Sep. 27, 2019

(86) PCT No.: PCT/US2019/053677
§ 371 (c)(1),
(2) Date: Mar. 26, 2021

(87) PCT Pub. No.: WO2020/069457
PCT Pub. Date: Apr. 2, 2020

(65) Prior Publication Data
US 2022/0042277 A1     Feb. 10, 2022

Related U.S. Application Data

(60) Provisional application No. 62/757,459, filed on Nov. 8, 2018, provisional application No. 62/738,974, filed on Sep. 28, 2018.

(51) Int. Cl.
*G05D 9/00* (2006.01)
*E02F 5/10* (2006.01)

(52) U.S. Cl.
CPC .............. *E02F 5/101* (2013.01); *E02F 5/107* (2013.01); *G05D 9/00* (2013.01)

(58) Field of Classification Search
CPC ........ F16K 21/185; F16K 31/22; F16K 31/24; G05D 9/02; G05D 7/0146; G05D 7/0166;
(Continued)

(56) References Cited

U.S. PATENT DOCUMENTS

| 358,677 A * | 3/1887 | Kommerell ............. E03D 1/165 |
| | | 137/135 |
| 1,109,149 A * | 9/1914 | Scarfe ..................... F16K 31/22 |
| | | 137/614.16 |

(Continued)

FOREIGN PATENT DOCUMENTS

DE        3937685 A1     5/1991

*Primary Examiner* — Hailey K. Do
(74) *Attorney, Agent, or Firm* — Thomas M. Freiburger

(57) ABSTRACT

A liquid level control system, which may be used with a clarifier in a sewage treatment plant, manages liquid level of an upstream basin by controlling liquid flow in or out of a system that may use a midstream device to equally distribute flow in or out of the basin. This headloss inducing device creates a non-linear relationship between upstream liquid level to be controlled and the lesser downstream liquid level behind the gate or valve. Without the use of electrical controls, the systems of the invention include a gate or valve with counterforces that manage the outflow stream of liquid while accounting for the non-linear head loss created by the midstream device, thus reaching a desired liquid level range for all system flowrates.

24 Claims, 10 Drawing Sheets

(58) Field of Classification Search
CPC ......... Y10T 137/7342; Y10T 137/7391; Y10T 137/7485; Y10T 137/742
See application file for complete search history.

(56) References Cited

U.S. PATENT DOCUMENTS

| | | |
|---|---|---|
| 2,168,177 A | 8/1939 | Danel |
| 3,217,497 A | 11/1965 | Humpherys et al. |
| 3,695,043 A | 10/1972 | Vallet |
| 4,994,179 A * | 2/1991 | Keeter .................. B01D 21/26 210/534 |
| 6,719,491 B2 * | 4/2004 | Kezele ................... E02B 7/205 405/87 |
| 9,919,244 B2 | 3/2018 | Heimdal et al. |
| 2006/0032544 A1 * | 2/2006 | Malenfant ............ G05D 7/0166 137/448 |

* cited by examiner

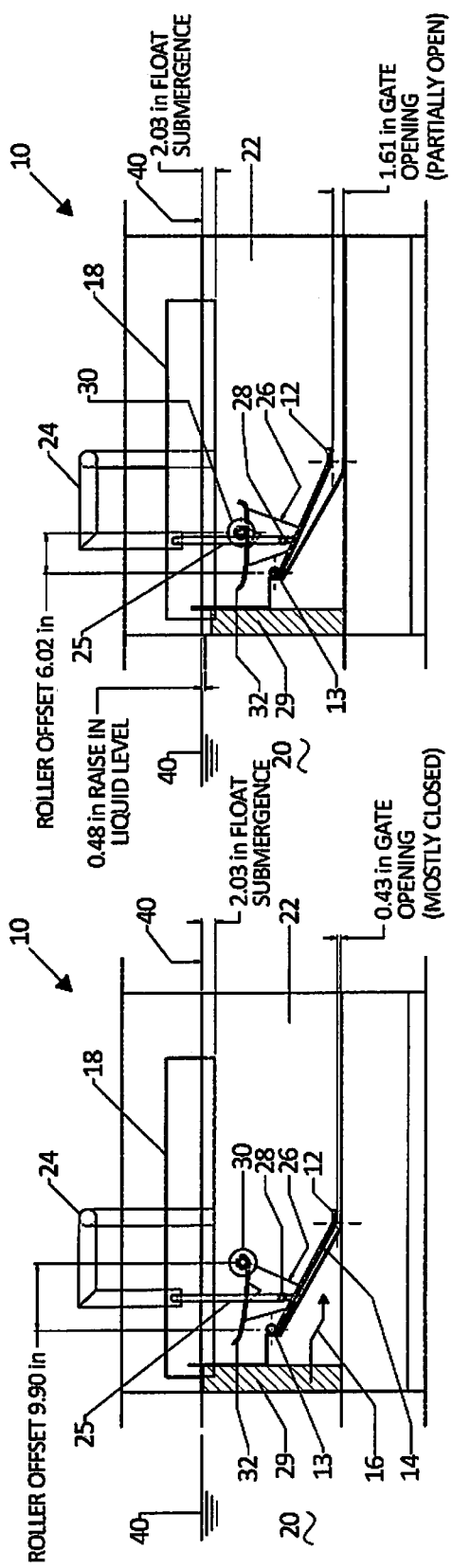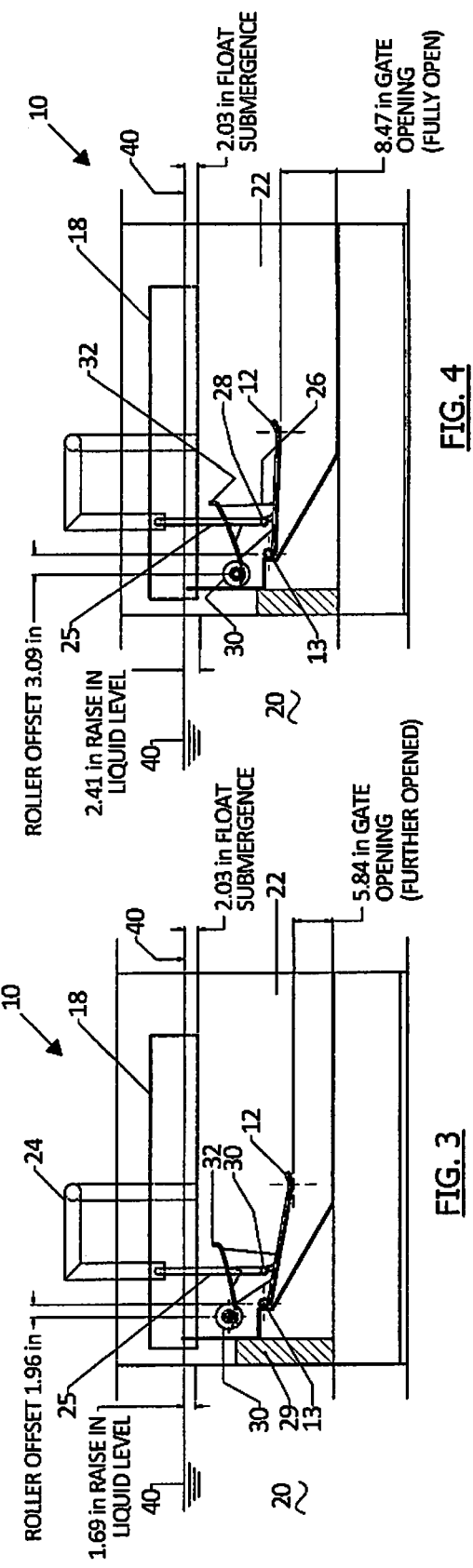

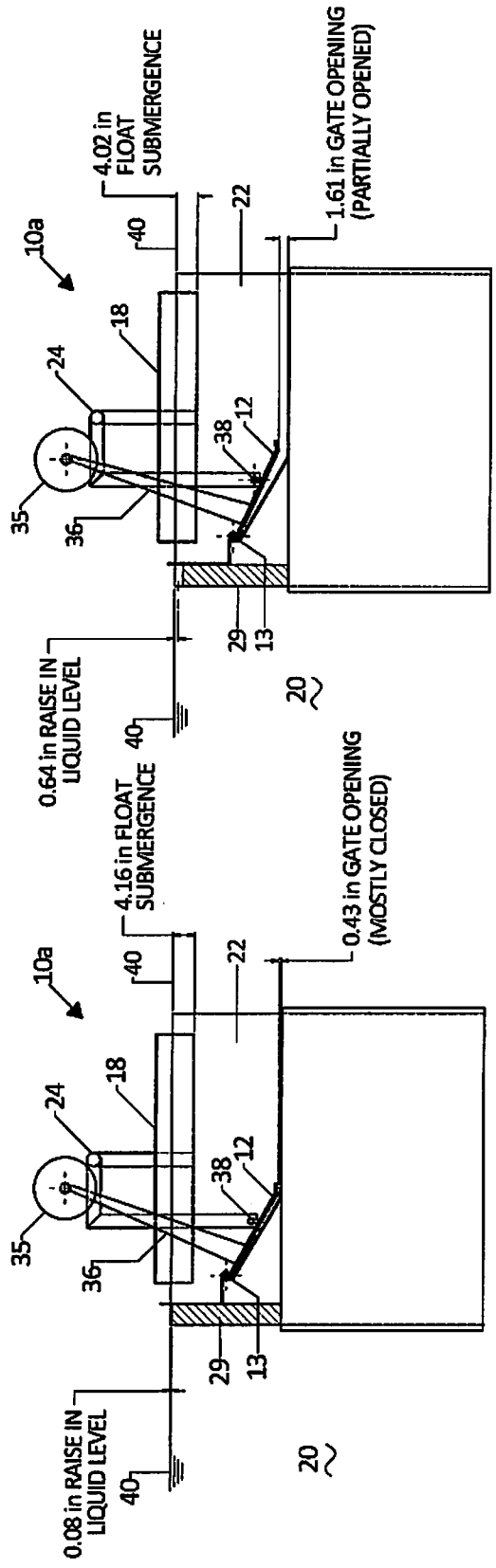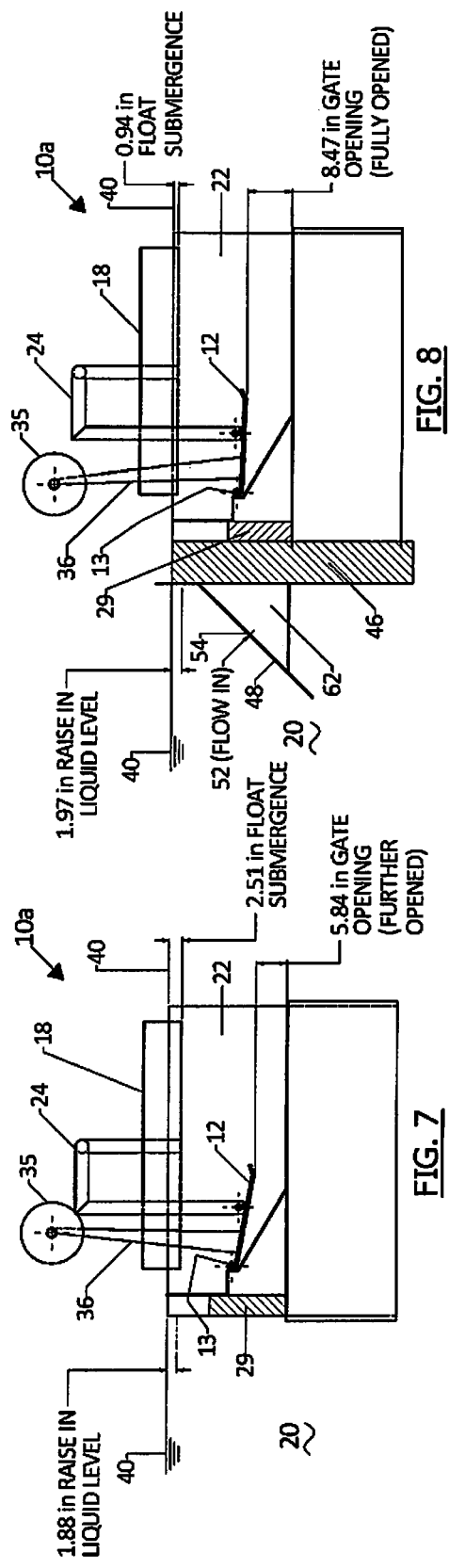

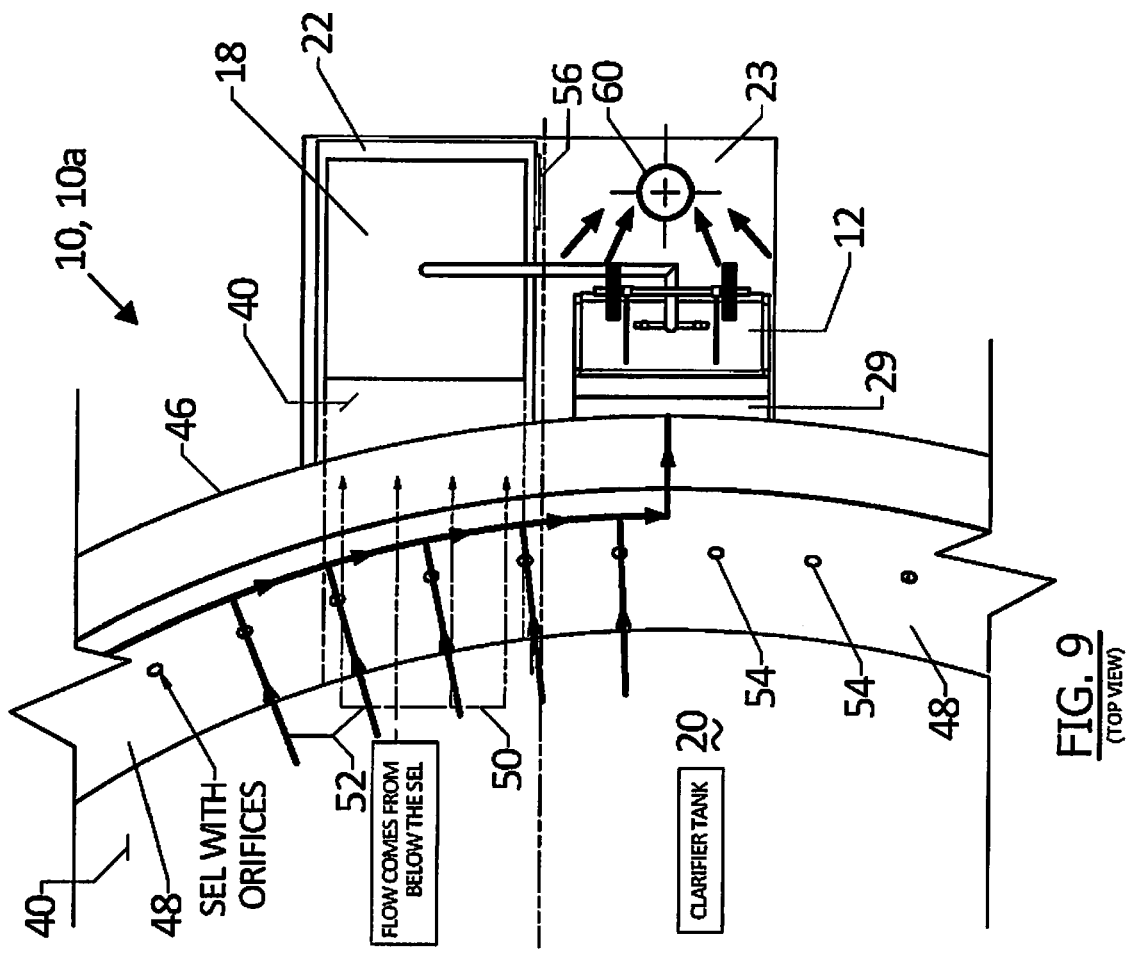

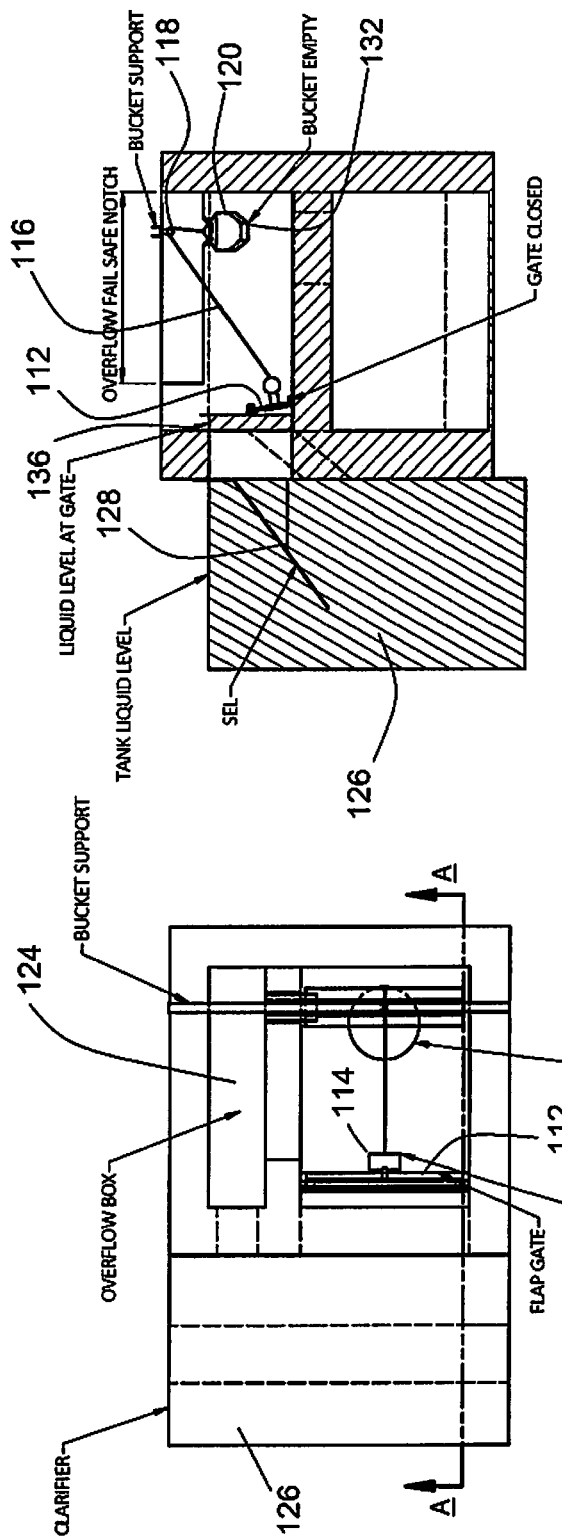

SECTION B-B

TOP VIEW OPEN POSITION

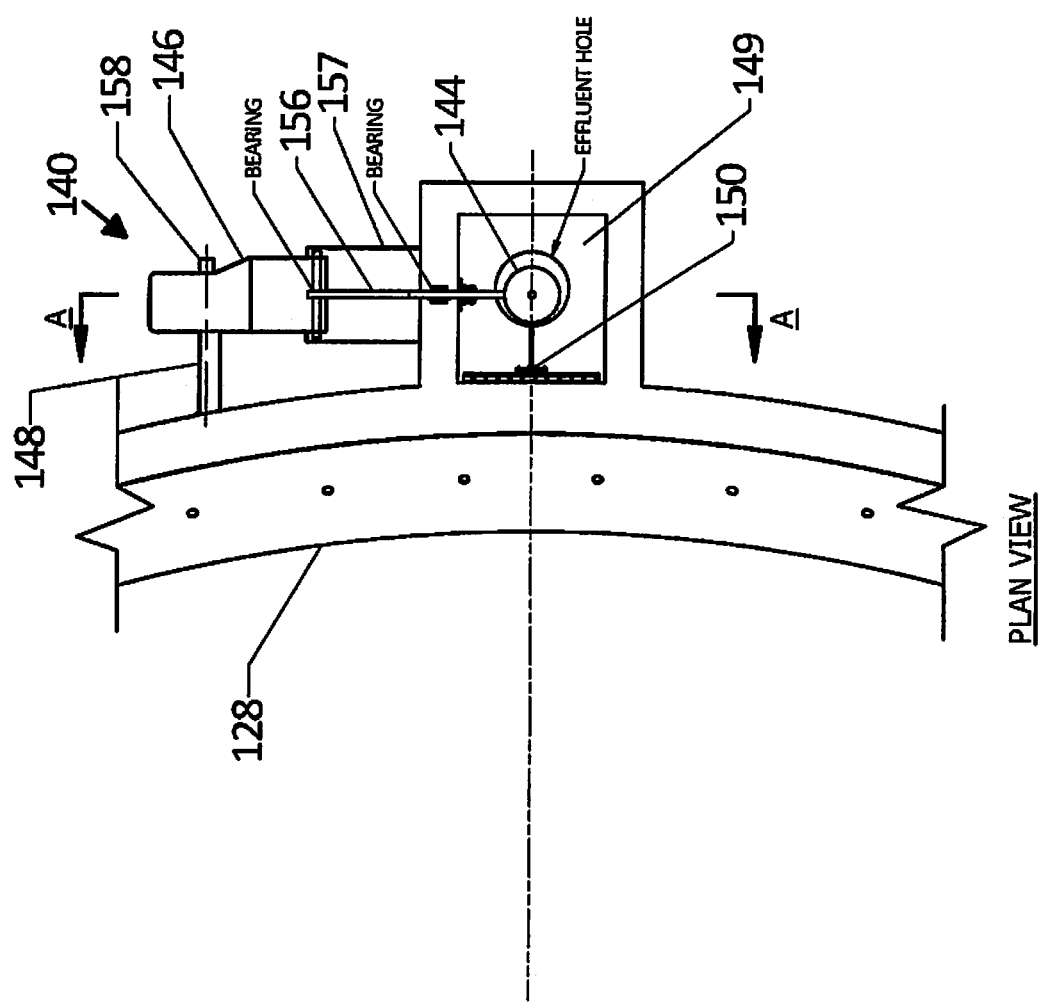

BUOYANT MECHANICAL LIQUID LEVEL CONTROL

This application claims priority from international application number PCT/US2019/053677, filed Sep. 27, 2019, which claimed benefit of provisional application Serial Nos. 62/738,974, filed Sep. 28, 2018, and 62/757,459, filed Nov. 8, 2018.

BACKGROUND OF THE INVENTION

This invention concerns liquid level control, by controlling flow into or out from a vessel or basin. In one application the vessel is a clarifier in a sewage treatment plant.

In absence of an overflow weir, a midstream device is needed to equally distribute flow from a clarifier. The problem with conventional liquid level control systems today is that they cannot efficiently handle non-linear changes due to head losses through an interconnecting system or midstream device without some type of electrical controls, which can be expensive and potentially create problems if an electrical outage occurs. In many cases a simple overflow weir is not possible or desired, and a simple float, counterweight or spring controlled valve or gate cannot perform well due to non-linear changes as pointed out above.

SUMMARY OF THE INVENTION

The current invention in one form is a mechanical float-driven liquid level control system configured such that regardless of changes in the flow, even sudden surges of flow in the tank or vessel, the liquid level can be controlled and managed within a set of desired parameters. The system in this form is configured in several different embodiments. Most include a float and a gate, preferably a flap gate hinged at its upper end. All have a counterweight or counter force that controls gate opening and closing so that a controlled outflow of water is maintained under all conditions, preventing flushing or surging of water out of the vessel.

In a first embodiment a float serves as the "actuator", applying just sufficient force to move the gate and place the counterweight at the correct position to create the moment force required to open or close the gate the desired amount to reach equilibrium. When at equilibrium, with the gate not moving, there are equal opening and closing forces on the flap gate. The float serves prior to equilibrium as a moving force and at equilibrium, a holding force which holds the gate in the ideal location where the counterweight creates the right amount of moment to counteract the moment created from the liquid flowing through the gate and the hydraulic pressure pushing the gate open.

In the first embodiment the counterweight, connected to the flap gate, rolls along a curved track to place the counterweight at the correct location to control the opening or closing of the gate. In a second embodiment the counterweight is fixed to the gate, on an upwardly extending lever arm. The counterweight in the second embodiment is larger in comparison to the roller counterweight, in order to ensure that the float is always submerged. When the gate is closed the counterweight is angled outwardly/forwardly above the gate to provide maximum moment or closing force due to the counterweight. As the gate opens wider due to increased tank liquid elevation causing the float to produce an added opening force, the counterweight swings upwardly, which can be as high as a vertical position in which the counterweight has little effect on the gate. When the gate is just closed, the float is submerged enough that, along with the hydraulic pressure produced by liquid behind the gate, it will equalize the moment applied by the counterweight. As the liquid elevation in the basin increases, the float rises, creating a vertical force causing a moment opposing the moment applied by the counterweight. This in turn raises the gate and float, which is now less submerged, creating equilibrium again, while allowing additional flow through the gate. As the gate rises, the counterweight moment decreases as noted above, and the float becomes less submerged, allowing for equilibrium to be reached at each desired flow. Therefore the system maintains level control without allowing sudden surging or flushing of water through the gate. The same principles work as the liquid level in the tank decreases, which lowers the gate position; the counterweight increases in applied moment as the gate closes.

Note that with a constant inflow of liquid to the basin, and thus a constant rate of outflow, the gate will be open somewhat and at equilibrium.

In a preferred further embodiment the flap gate again has a counterweight tending to close the gate, with an actuator that comprises a liquid-fillable container (sometimes called a bucket herein) that will pull the flap gate open via a cable or cord (or other mechanism) as the bucket fills. The main basin is connected to an overflow box or area that floods as the basin's water level rises, staying at the same level as the basin. From the overflow box, or directly from the basin, a spillway feeds liquid into the bucket or container, which is suspended from a cable that rides over a pulley and has an opposite end connected to the flap gate. As the bucket or container receives liquid, it also pours some of the liquid out through an opening, e.g. a hole or notch in the bucket, into a discharge area. At fairly high flow the bucket can fill faster than the opening can release liquid. An increase in bucket liquid level results in an increase in force exerted toward opening the gate, so that higher flows of liquid from the main basin will cause the gate to open farther, thus releasing liquid at a greater rate. In this way, the system seeks equilibrium. At equilibrium the bucket outflow equals the bucket inflow. Note that the force of the bucket or container can be transmitted to the gate in ways other than using a cable or pulley (such as levers, gears, chain and sprockets, hydraulics or pneumatics, etc.). The term "mechanical" as used herein in the various embodiments is intended to include linkages that have such features.

When the basin liquid level has lowered, approaching design level, the flow into the bucket slows, eventually causing the bucket's water level to be lowered. This is because flow out of the bucket will be greater than the reduced inflow from the spillway. In turn this allows the gate, under the influence of the counterweight, to move toward closure.

In another form of the invention, a flap gate again has a counterweight or counter force tending to close the gate, against the opposing static and hydrodynamic head trying to open the gate. The counterweight is also connected, via a pivoted lever, to a tiltable bucket that receives overflow from the main basin, e.g. a clarifier. The bucket is on a generally horizontal pivot axis and extends forward and rearward of the axis, being configured such that when the water level in the bucket reaches a certain point, the bucket will rotate on its pivot axis to dump the accumulated liquid into a discharge area or dropout box, in a flushing action. The downward tipping of the bucket also pulls the flap gate toward the open position, against the influence of the counterweight. The bucket discharges beyond the gate, into a discharge area equivalent to the effluent chamber in the first embodiment. Once the bucket has substantially emptied, the counterweight will close the flap gate, also raising the emptied pivotal bucket to its normal position to accumulate more water. The cycle repeats until the main basin has been brought back to nominal level.

In still another form of the invention, a knife gate is employed rather than a flap gate. The vertically operable knife gate has a weight or a spring (i.e. a counterforce) tending to hold the knife or gate member down, at the closed position. An actuator comprising a leaky bucket, generally as described in the embodiment above, receives liquid from the basin when the basin's level exceeds design level. The greater the liquid level over design level, the more rapidly liquid flows into the bucket. As above, the bucket is connected mechanically to the gate, thus tending to lift the knife gate when the bucket's weight increases due to the bucket's liquid level increasing. One preferred form of connection is a flexible line with pulleys, from the bucket to the gate closure member. The gate's opening and closure operate similar to the bucket design described above.

The flap gates described above can take other forms, such as a butterfly valve, ball valve, diaphragm valve or globe valve, movable weir gate, with appropriate biasing toward the closed position. Biasing for such valves will typically be with springs, and actuation can be by leaky bucket, float or other mechanical arrangements described above. Butterfly valves, in particular, are often produced in large sizes.

It is an object of the invention to provide an efficient, relatively compact and simple mechanical system for level control in a basin such as a clarifier, without a typical overflow weir but with a midstream headloss inducing device. Systems of the invention can control inflow to a basin as well. These and other objects, advantages and features of the invention will be apparent from the following description of a preferred embodiment, considered along with the accompanying drawings.

DESCRIPTION OF THE DRAWINGS

FIG. 1 is a schematic side elevation view indicating the level control system of the invention with a float, a flap gate or valve and a roller counterweight.

FIG. 2 is a similar view, showing a flap valve of the system partially opened and with the rolling counterweight progressing back on its track.

FIG. 3 is another similar view, showing the flap valve further opened and the counterweight farther back on the track.

FIG. 4 is another similar view showing the flap valve fully opened, with the counterweight at its maximum rearward position.

FIG. 5 is a schematic elevation view showing a level control system with a flap valve in closed position, and a fixed lever-mounted counterweight secured to the flap valve and at its maximum forward position, tending to hold the valve closed.

FIG. 6 is an elevation view similar to FIG. 5, showing the flap valve partially opened with the counterweight swinging upwardly, being fixed to the flap.

FIG. 7 is a similar view showing the flap opened further and the counterweight swung to a higher position, the lever almost vertical.

FIG. 8 is a similar view showing the flap fully opened and with the counterweight swung to a position nearly directly above the flap hinge.

FIG. 9 is a schematic plan view showing a system of the invention applied to a clarifier launder whose level is not controlled by an overflow weir but by a midstream headloss inducing device.

FIGS. 12 and 13 are plan and side elevational section views illustrating the system.

FIGS. 16 to 18 are schematic plan and elevation views in section, showing another embodiment of the invention, with a flap gate in closed and open configurations, respectively.

DESCRIPTION OF PREFERRED EMBODIMENTS

Figure 10:
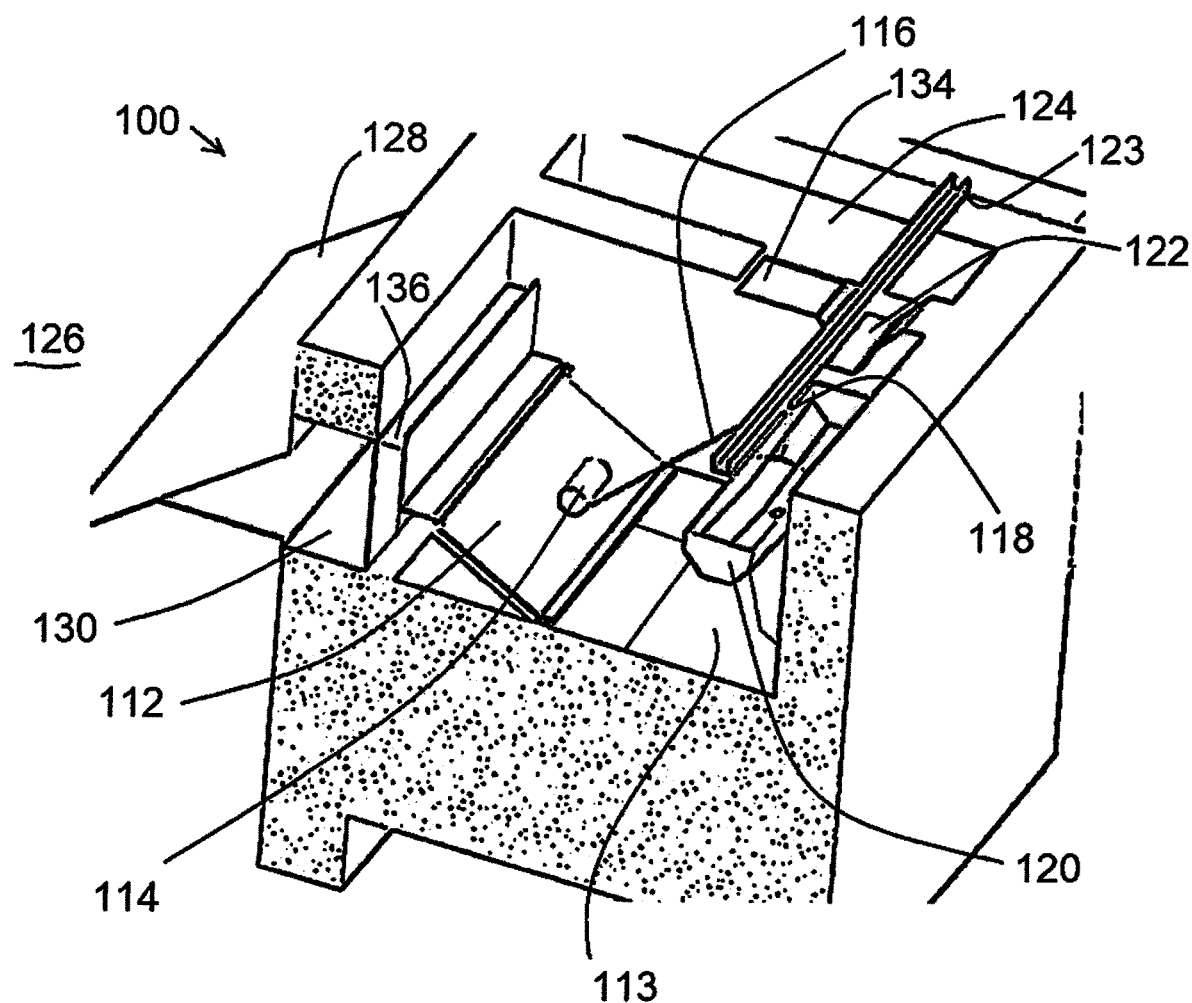
FIG. 10 is a perspective schematic view, partially cut away, indicating one embodiment of the invention in which a level control system receives liquid from a submerged effluent launder clarifier.
Figure 11:
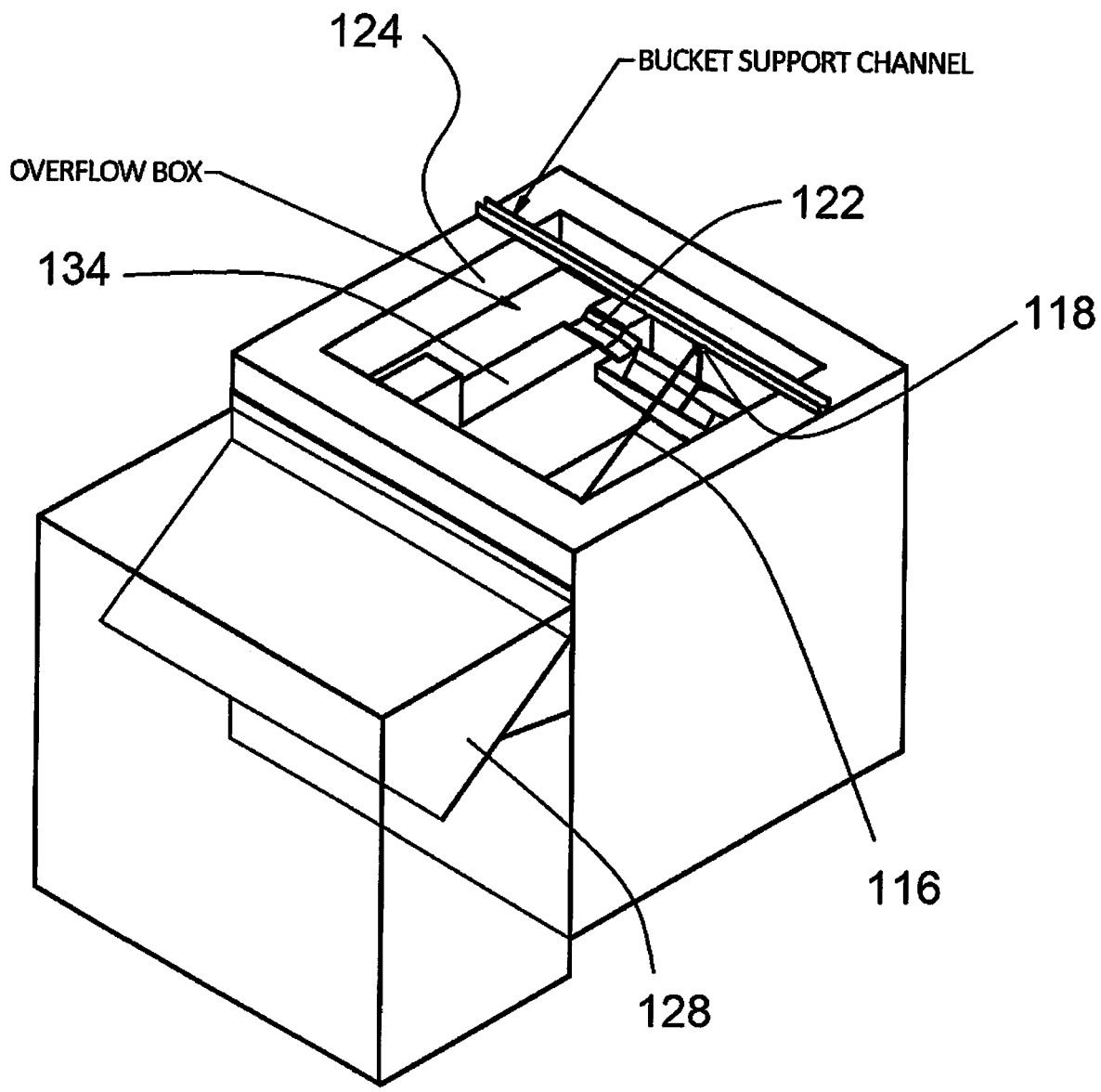
FIG. 11 is a schematic perspective showing the system of FIG. 10.

In the drawings, FIGS. 1 through 4 show a first embodiment, each view showing an equilibrium state. FIG. 1 shows a liquid level control system 10 with a gate comprising a flap valve 12 in a closed, or essentially closed position. The flap valve, supported at a hinge 13, closes at an opening through a plate or gateway 14, to control the flow of water through the valve, the flow being indicated by the arrow 16.

A float is shown at 18, positioned in liquid which is at the level of the tank, basin or vessel which is to the left in FIG. 1, generally indicated at 20. The liquid buoying the float 18 is in a float vessel or float box 22 and remains at the same level as the liquid in the large tank or vessel 20 (which can be a clarifier in a wastewater treatment plant), being connected thereto. The float box 22 is behind and separated from the effluent box 23 (see plan view of FIG. 9); it should be noted that the float 18 could actually be directly in the main basin 20, but in many cases this could interfere with equipment of the basin, especially a clarifier. As indicated schematically in the drawings, the float 18 is connected by a rigid link 24 to the flap valve, via a pivoted bearing connection 28. The rigid link 24 has a lower end 25 that is bifurcated and straddles a roller support 26 that is secured to the flap 12. The float 18, when the float vessel liquid 22 rises, tends to pull upwardly on the closure flap 12. The position of the pivot connection along the length of the flap 12 is important in the leverage of the float affecting the lift force on the flap. The pivot connection 28 distance from the gate pivot 13 is important because it controls two competing factors: One factor is how strong/effective the float is at actuating the gate/counterweight (greater horizontal distance from gate pivot 13 produces greater force). The other factor is the closer the pivoting connections are the less the float needs to travel vertically per unit of flap movement. This means less total tank/vessel liquid level change for a given effect.

A liquid entry chamber, shown at 29, receives water from the large tank 20, such as water that has exited a clarifier (20) via an apparatus such as a submerged effluent launder 48 (FIG. 9).

The roller support 26 carries a rolling counterweight 30 whose position changes with the angle of the flap 12.

In FIG. 1 the system is in equilibrium. The water has risen to the point that a hydraulic head exists in the entry chamber 29 to almost push the flap valve open, or the flap valve can be considered slightly open, at very low flow into the entry chamber 29. The counterweight is fully forward on its track 32, exerting the maximum closing force (moment) tending to close the valve. When the liquid elevation 40 in the basin/tank 20 rises, the float 18 tends to pull upward and open the flap. That is, even if the flap has not yet moved, the lifting force builds up as the tank liquid level 40 rises, increasing upward buoying force on the float until the rolling counterweight 30 is moved by the counter moment the float produces. The rolling counterweight 30 will roll backward, helping open the gate and lifting the float until equilibrium is found between the hydraulic head and the counterweight. At equilibrium the flow out the valve is at a constant rate.

Note that in each of FIGS. 2 through 4 the liquid level in the large tank 20 has increased incrementally. In FIG. 1 the tank water level 40, which is also the level 40 of the liquid in the float vessel 22, can be assumed to be at "zero", i.e. essentially at the desired level for the large tank 20. The flap valve 12 can be assumed as slightly open and accommodating a steady but low flow of liquid from the entry chamber 29, which receives liquid from the large vessel 20. As long as the flow through the system remains at that same rate, equilibrium will remain. From drawing to drawing in FIGS. 1 to 4, i.e. between drawings, equilibrium has been interrupted, but equilibrium is again found at each of the drawings.

It should be understood that the liquid entering the entry box 29 is assumed to have passed through a device or apparatus or element that results in a head loss. One prime example is a launder of a clarifier in a wastewater treatment system as noted above, which may be a submerged effluent launder as described in U.S. Pat. No. 9,919,244 and as indicated at 48 in FIG. 9.

In FIG. 2 the flap valve has opened somewhat as shown, with the flap 12 slightly lifted from the position shown in FIG. 1. The counterweight 30 has rolled back somewhat due to the changing angle of the track 32, again coming to equilibrium among the counterweight moment, the opposing float moment, and the flow pushing the flap 12 toward opening, which is a function of hydraulic head of the liquid in the entry chamber 29, which has dropped somewhat. The liquid supporting the float 18 has risen slightly, and the float has risen with it, and the flap 12 has risen accordingly, but with leverage due to the position of the pivot connection 28. In the example given, the level of the liquid has risen 0.48 inch, and the bottom end of the flap 12 has risen to 1.61 inch, as compared to the 0.4 inch height shown in FIG. 1.

Note that the depth of submergence of the float 18 in the liquid of the vessel 22 is the same, or essentially the same, as in FIG. 1. In fact, in each of the equilibrium drawings of FIGS. 1 through 4, the depth of float submergence is the same, or essentially the same, in this particular embodiment. This is because hydraulic pressure on the flap preferably is fully balanced by the position of the counterweight (also taking into account weight of the gate flap).

In FIG. 3 the level 40 of the liquid in the main tank 20 has increased further, due to increased flow into and through the large tank 20 causing additional head losses through a device or apparatus, such as described with reference to FIG. 9. The example shows an increase in the tank 20 and the chamber 22 to 1.69 inches above desired level, from 0.48 inch in FIG. 2. The float 18 is thus higher, and the flap 12 has opened further, tilting the track 32 further, so that the roller counterweight 30 has moved farther back. Equilibrium has again been reached. The hydraulic head at the entry chamber 29 has again fallen, as liquid has moved more rapidly through the more widely opened gate valve.

In FIG. 4 the flap 12 has reached a maximum open position. The tank 20 (and chamber 22) liquid level 40 has risen to 2.41 inches above design level. Hydraulic head in the entry chamber 29 has fallen lower, and the float 18 has risen with the level of liquid. The rolling counterweight 30 is at a maximum rearward position, shown behind the flap pivot axis and putting a small lifting moment on the flap 12. The float 18's position may prevent further flap opening; a stop may be provided to limit flap range. The valve may be fully open, but the hydraulic head at the valve (chamber 29) is considerably less than in FIG. 1, because of the head losses experienced through the intermediate apparatus as shown in FIG. 9.

As the level 40 of the liquid decreases, the float will be lowered due to the dropping level, causing the flap to move toward closure, to tilt the track 32 so that the roller gradually moves back forward, although equilibrium may be reached at different stages. Finally the valve closes fully, with the influence of the counterweight 30 moving back to the full-forward position shown in FIG. 1.

As seen from the above, there are several forces working together and in opposition to each other to assure orderly opening of the flap valve, preventing a sudden opening which will "flush" the liquid quickly out through the valve, but still accommodating an increase in flow rate through the tank 20 and through the system without an impermissible rise in tank liquid level. The float 18, the rolling counterweight 30, the weight of the gate 12 and the hydraulic head existing behind the valve all cooperate to cause this result. The goal is to steady flow through the system while minimizing the total basin/liquid level change.

FIGS. 5 to 8 show another embodiment as described above, in which a modified level control system 10a has a flap valve with a hinged flap 12 on a hinge 13, the flap having secured to it a fixed rocking counterweight 35. The counterweight 35 is secured to the flap via a lever arm 36, as shown, connected at a strategic position along the length of the flap 12 so as to achieve valve opening and closing function generally similar to that described above. Note that the terms gate and valve are used interchangeably herein.

FIG. 5 shows the level 40 of liquid and the position of the float 18 and the flap 12 as similar to those in FIG. 1. The counterweight 35 at the end of the lever arm 36 is in a position maximum forward of the flap hinge 13, thus exerting maximum closure moment on the flap. The flap 12 can be assumed to be closed or very slightly open, in an equilibrium state with low inflow through the system, in FIG. 5.

FIG. 6 shows the system 10a with the flap valve opened more than in FIG. 5, the flap having been rotated upwardly slightly as shown. The liquid level 40 has increased slightly, e.g. by 0.64 inch, the float 18 has become slightly less submerged, and the position of the counterweight is back from that of FIG. 5, thus exerting less closure moment. The float linkage 24 is secured to the flap 12 at a pivot connection 38, and the float's lifting force has been lessened because of the rising of the float 18 in the liquid. Unlike the system of FIGS. 1 through 4, where the submergence of the float remains the same or essentially the same in different positions of system equilibrium, in this embodiment the float's submergence varies, lessening with the upward movement of the valve flap 12.

As in the first embodiment, the hydraulic head in the entry chamber 29 is lower due to midstream device headloss in FIG. 6 than in FIG. 5, as the valve has opened wider, which decreases the lifting force.

In FIG. 7 the flap 12 is nearly fully open, and the counterweight 35 has swung further upwardly, creating a lesser closing force on the flap. The float 18 has risen even higher, as the liquid level 40 of liquid has increased (e.g. 1.88 inches above the starting level). The float 18 is submerged even less in the liquid, exerting less lifting force on the flap. The hydraulic head in the chamber 29 has dropped further. The system is in equilibrium.

In FIG. 8 the system again is in equilibrium and somewhat similar to that of FIG. 4, with the valve flap 12 fully opened, the float 18 risen to a maximum position, the liquid level 40 approaching a peak level (shown at 1.97 inches above starting/design level), and the counterweight 35 almost directly above the flap hinge 13 so as to create essentially no further closing moment on the flap. Only the weight of the gate is creating a closing force at this point. The float submergence is even less. The hydraulic head in the chamber 29 has decreased further, but a considerable liquid outflow rate through the valve still exists, with the valve fully open. Again the system is in equilibrium.

The system of the invention will then lower the level 40 of liquid in the large tank 20, which is equal to that of the float vessel liquid, ultimately back to the design or intended level, which is essentially shown in FIG. 5. In FIG. 8 the flap valve 12 is open wide, and the system is designed such that the open valve will discharge liquid at a sufficient rate that the tank liquid level will eventually be brought back down to the intended, design level. As explained above, there is head loss between the tank liquid level 40 and the entry chamber 29, which buffers the outflow, but outflow would continue as long as the valve is open. If the valve 12 remained open (which it will not), the liquid level 40 would fall below the intended level. The level control system of the invention is designed to return liquid level 40 to the intended level in an orderly way, without flushing, such that the competing and cooperating components of hydraulic head in the chamber 29, counterweight 35 position, weight of gate 12, and float 18 status will cause the valve 12 to fully close when that design liquid level, i.e. minimum level, has been reached.

As the liquid approaches and then reaches design level, the flap 12 will close in an orderly way, the float 18 having moved back down to the position shown in FIG. 5 and the counterweight 35 firmly closing the flap valve with maximum moment effect.

As mentioned above, one application of the level control system embodiments of the invention is a wastewater treatment clarifier which does not control level via an overflow weir. In such a clarifier, which can employ a submerged effluent launder (SEL) as in U.S. Pat. No. 9,919,244, the clarifier's liquid level must be controlled by other means. The invention achieves this without electrical sensors, motors or other electrical components. FIG. 9 shows such an application of the system of the invention. The clarifier 20 has a clarifier wall 46 with the level control system 10 (or 10a) of the invention attached to the outside of that wall. The float vessel with liquid is shown at 22, the float at 18, and the flap valve of the system is indicated at 12. The clarifier has a submerged effluent launder identified at 48. The liquid level in the float box 22 is maintained at the same level as that of the clarifier 20 via liquid communication below the launder 48, as indicated by flow arrows 50 in FIG. 9.

The launder operates by accepting clarifier liquid from below the surface in the clarifier, as indicated by arrows 52 in the drawing. The effluent water flows through sub-surface holes 54 in the submerged effluent launder, collecting the sub-surface water into the launder, flowing eventually into the entry chamber 29 as schematically shown in the drawing. Head loss occurs due to the need for effluent clarifier liquid to flow through the launder orifices 54 and launder friction, the liquid then reaching the chamber 29; thus, the level in the chamber 29, during adjustments of level made by the level control system, experiences head loss.

FIG. 9 also shows that a weir notch 56 can be included in the float box 22, at a high overflow level, one which is extreme and should not be exceeded in typical operation situations. This provides a safety feature, as any such excessively high liquid in the clarifier will flow over the weir notch 56, down into an influent box 23 and out the exit pipe 60 of that basin without having to pass through the SEL 48 system. Thus, the float vessel 22 serves two different purposes.

If the float 18 is in the basin itself as mentioned above (which ordinarily would not be done in a clarifier), the overflow notch can be in the clarifier wall.

In addition, the application to a submerged effluent launder (SEL) 48 is schematically indicated in FIG. 8, on the inside of the clarifier wall 46. FIG. 8 indicates that the SEL 48 is positioned to receive clarifier water from the sub-surface inlet orifices 54, and that water is then collected inside the launder, in a chamber 62. This water then goes into the dropout box or chamber 29.

FIGS. 10 through 15 show a different embodiment of a level control system in accordance with the invention. The components of this system 100 include a hinged flap gate 112, an effluent chamber or area 113, a counterweight 114, a cable or wire rope 116, a pulley 118, a gate lift bucket 120, a bucket fill spillway 122 and an overflow box or area 124. The structural component 123 seen in the drawing is a support for the pulley 118. The pivot flap gate 112 is used to control the outflow of the basin, which is to the left of the system 100, generally at 126 in FIG. 10. In this example the basin 126 is a clarifier of a wastewater treatment plant, the clarifier being fitted with a submerged clarifier launder 128 which may be generally as shown in U.S. Pat. No. 9,919,244. Such a launder receives clarifier liquid from below the liquid level. The liquid collected in the interior of the submerged effluent launder 128 flows into a launder dropout box or chamber 130, through which the liquid can flow through an opening (not seen in FIG. 1) to a flap gate 112, the flap of which is shown in closed position in FIG. 10.

Note that the pulley and cord of this embodiment could be replaced with a seesaw lever system, or a system with force/motion transmitted by sprocket/chain or by gearing, or other appropriate mechanical or hydraulic force-transfer arrangements.

The counterweight 114 is rigidly attached to the flap gate and is used to close the gate against the opposing hydraulic head trying to open it. The wire rope or cable 116 is attached to the gate 112 in order to convert the downward force of the gate lift bucket or container 120 to an upward opening force on the flap gate. The pulley 118 directs the wire rope and helps smoothly lift and lower the gate lift bucket 120 and gate 112. Note that the cable 116 can be connected to the flap gate 112 at a desired position, not limited to the counterweight as the connection point.

Figure 15:
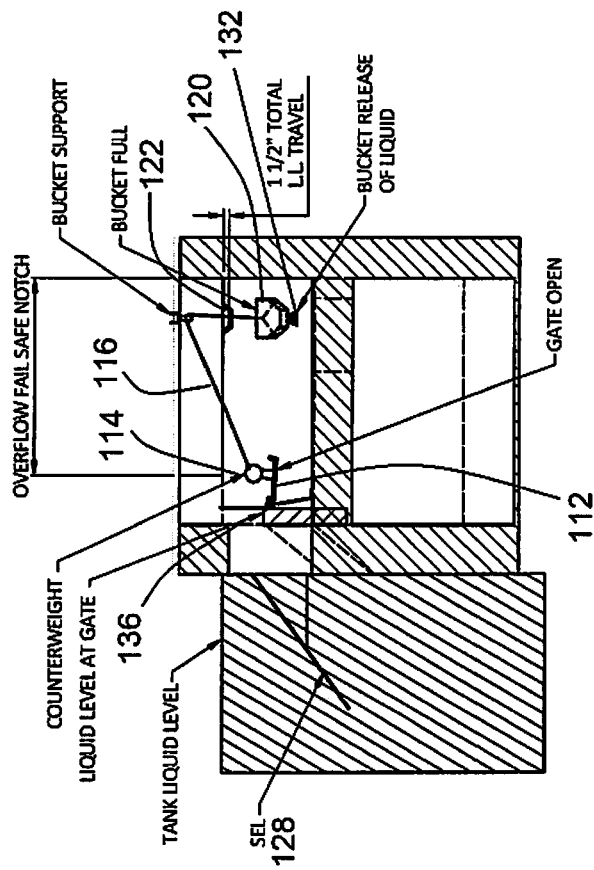
FIGS. 14 and 15 are plan and elevational section views showing the system in a different position of operation.

Referring to FIGS. 10-15, the gate lift bucket 120 is used to lift the gate 112. As the bucket fills with more liquid the gate will lift more. The gate lift bucket has release ports 132 (see FIGS. 13 and 15) or notches in any desired configuration, in order to continually release liquid from the bucket to enable the gate to close when the liquid level decreases in the overflow area 124 and large basin 126. The bucket fill spillway 122 is used to add liquid into the gate lift bucket 120 in order to increase the lifting force on the gate. The bucket fill spillway is designed to add increasingly more liquid into the gate lift bucket 120 as the tank water level increases, and thus flow increases. The bucket fill spillway 122 and gate lift bucket 120 are designed so that the bucket can fill faster than it can release the liquid from the gate lift bucket. When the gate lift bucket is completely full of liquid, the gate is designed to be in the fully opened position as shown in FIG. 15, and the level in the bucket fill spillway is at its design maximum liquid height and filling flowrate.

The overflow area 124 is used to supply the bucket fill spillway 122, and maintains the same liquid level in the large basin 126 (left in FIG. 10). The overflow box 124 is separated from the effluent piping/system.

In rare conditions under extremely high flow conditions the overflow box or area 124 is used to release liquid directly into the effluent chamber 113 without having to go through the effluent piping/launder system. The overflow area 124 has an overflow weir 134 that acts as a bypass so water can shortcut to the tank exit, i.e. the effluent chamber 113, where the flow exits without having to pass through the effluent piping/launder system, i.e. through the launder 128 and the flap gate 112.

Figure 14:
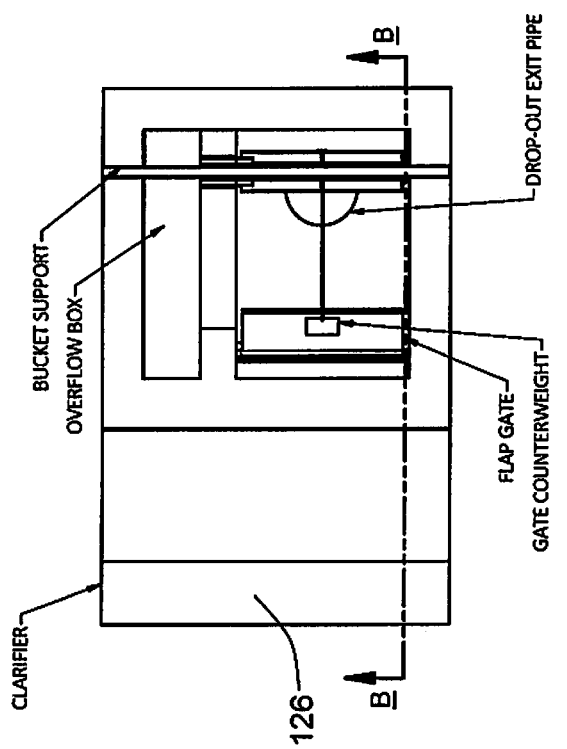

FIGS. 13 and 15, as well as FIG. 10, indicate at 136 liquid level at the gate, as in a dropout box or entry chamber 130 from a submerged effluent clarifier 128. The gate may be fully closed, as in FIGS. 10, 12 and 13, when flow from the basin 126 is at zero. When flow is increasing the gate may be partially open or fully open, with the bucket at a corresponding position. FIGS. 14 and 15 show the bucket fully downward and the gate fully open. Liquid level 136 behind the gate is lower here because of the high outflow rate and decreased hydraulic head due to the friction and entrance losses through the launder system. As flow levels off, the system will find equilibrium, with the bucket at a middle height, the gate partially opened, and liquid exiting the bucket at the same rate it comes into the bucket.

As explained above in regard to the earlier embodiments with a float, the overflow for extreme conditions could be directly in the basin wall. Any form of channel or conduit can be provided to direct liquid from the basin to the bucket as liquid rises above design level in the normal course.

In a modification of the above embodiments, the counterweight or counterforce could be one that does not decrease in closing moment as the gate opens further; this counterforce could remain essentially constant or even increase with increased gate opening. However, this would require different configurations or sizes of actuator devices, and the above embodiments are preferred.

Figure 18:
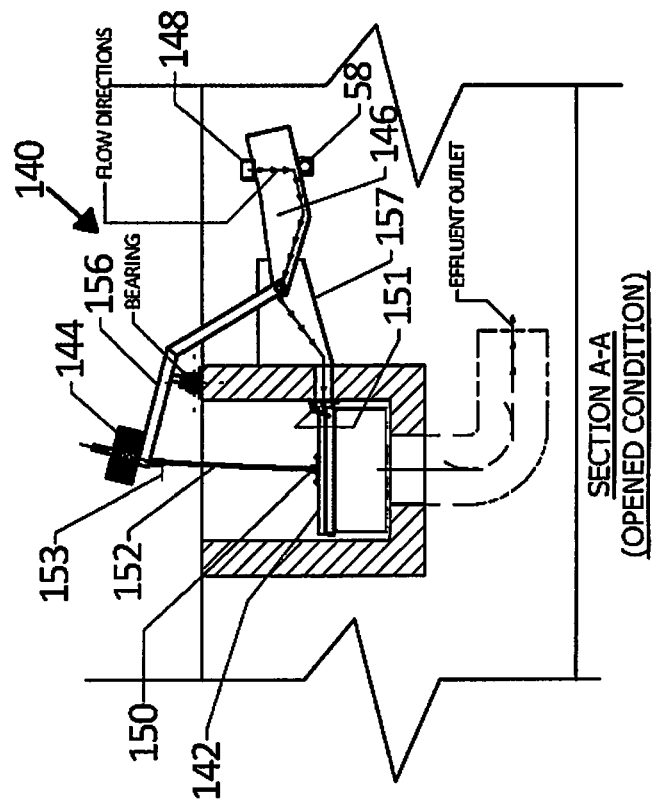
Figure 17:
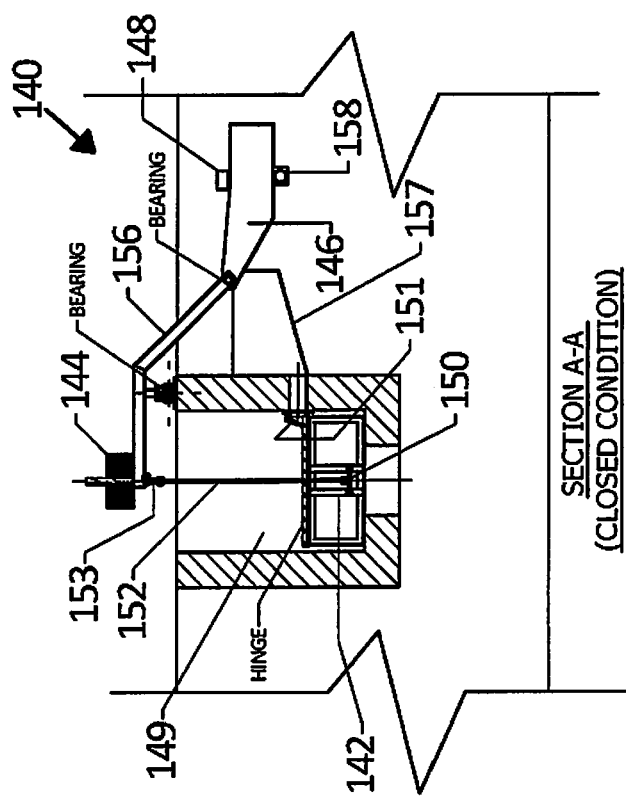

FIGS. 16, 17 and 18 show a further embodiment 140, in which excess water from the main basin causes a gate to be opened and closed in a series of flushes. Equilibrium is not reached in this embodiment.

The components of this design consist of a hinged flap gate 142, a counterweight 144, a hinged tipping/lifting bucket or container 146 and a bucket fill spillway 148. The pivoted bucket or container 146 is a vessel somewhat elongated in side view and preferably with a configuration similar to what is shown, to achieve the desired function. The pivot flap gate 142 is used to control the outflow of the basin, which may be via a dropout box or chamber 149 that receives liquid from a clarifier basin, via a submerged effluent launder, as in FIGS. 10-15. The counterweight 144 is attached to the flap gate at a pivot connection 150, via a link 152, and is used to close the gate against the opposing hydraulic head in a dropout chamber or box 149, trying to open it. A pivot connection may also be provided at the top of the link 152, at 153.

The hinged tipping/lifting bucket 146 is used to produce a large gate lifting force in order to oppose the force created by the counterweight. The bucket 146 is connected by a pivoted lever 156 to the counterweight 144 and link 152, as shown. The hinged tipping/lifting bucket 146 is first filled with liquid through an access port directly from the basin wall, referred to as the bucket fill spillway 148 (see particularly FIG. 16). This spillway is designed to fill the bucket when the liquid level in the basin increases above the design liquid level set point. The bucket 146 fills to a point at which it starts to tip the liquid about a bucket pivot axis 158, causing an extreme sloshing force. The sloshing force and tipping motion quickly opens the gate 142 to fully open, as in FIG. 18, creating a quick flush until most of the liquid in the bucket is drained, at which time the gate counterweight, bearing down on the lever 156, lifts the empty pivoted bucket 146 back to the position of FIG. 17 and closes the gate 142, resetting the system. This system will continue to flush by opening the gate 142, as required to keep the liquid level from increasing too high. During higher influent flowrates there will be more flushing per hour. During lower influent flowrates there will be less flushing per hour. This design has basically two settings: opened and closed.

Note that the tiltable bucket 146 dumps to an effluent area downstream of the gate 142. This can be via a hole 151 that can be adjustable in size to adjust the length and frequency of the flush at a given flow rate, slowing the flow of the flushed liquid. Frequency can be affected in that the pivoted bucket pours into a discharge area 157, leading to the exit hole 151, and these components can be arranged so that the tipped bucket extends down into the liquid in the discharge area 157. Liquid pooled in that area 157 will delay the pouring of liquid out of the bucket and thus return of the bucket to the FIG. 17 position, until the liquid is sufficiently drained out the hole 151. As an alternative, the flushing bucket 146 can be configured so as not to pour liquid out the end but to discharge liquid through an opening in the bucket 146 down into the bucket discharge area 157, thus metering out the liquid (the bucket opening can be adjustable in size) so as to control frequency and flushing. A small one-way flap valve 155 preferably is included, preventing any liquid from back-flowing through the hole 151.

At zero flow, the tank or basin water level is at its zero outflow set point. At this point, as the water level rises, water from the clarifier flows into the dropout box or chamber 149, which may be via a submerged effluent launder as above, or other head loss device or element. At the same time, the bucket fill spillway 148 supplies the pivoted gate lift bucket 146. The pivoted gate lift bucket is designed to release liquid continually, batch by batch. The bucket fill spillway 148 is designed to add increasingly more liquid into the gate lift bucket as the tank water level increases.

Figure 19:
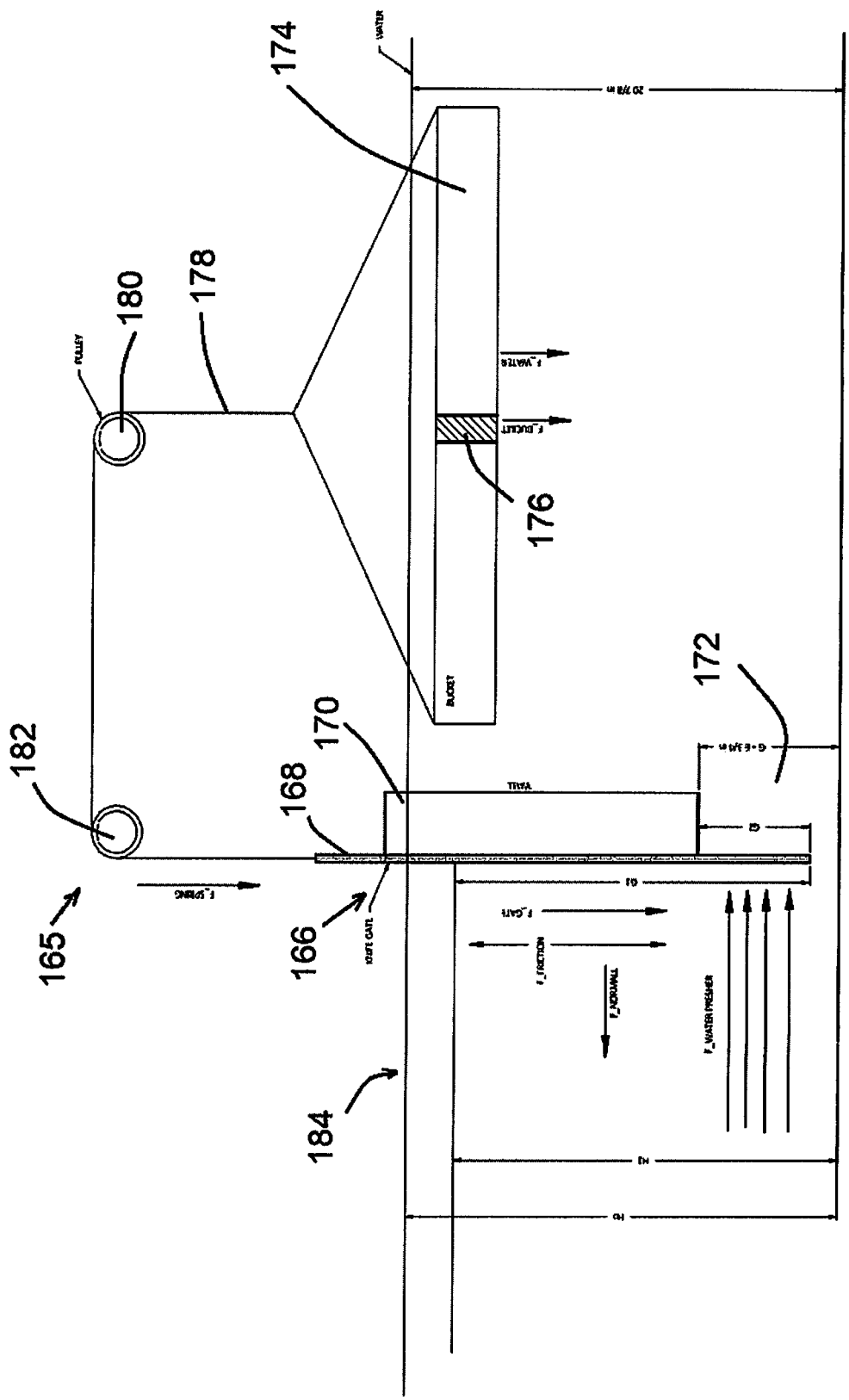
FIG. 19 schematically shows in side elevation a further embodiment with a knife gate rather than a flap gate.

FIG. 19 shows another embodiment 165 of the invention, wherein the gate 166 is not a flap gate but rather a knife gate or valve. The gate closure member 168 travels in a vertical plane and is positioned against the exterior tank wall 170, as shown. As the gate is lifted, liquid flows out through an opening 172 in the wall. Suitable water sealing elements act between the wall and gate, such as neoprene or other elastomeric material.

In this embodiment the weight of the gate can be sufficient to act as an urging influence toward closure of the knife valve. Alternatively, a spring or springs or added weight can be used to further urge the valve toward closure.

The actuator in this embodiment is, as in one of the earlier embodiments, a bucket or container 174 that has an opening, such as a notch 176 as indicated. The notch can be V-shaped or any shape to provide the ideal flow rate versus liquid depth in the bucket/container desired. A flexible line, such as a cable or wire rope 178, suspends the leaky bucket 174 and, via pulleys 180 and 182, connects to an upper end of the knife gate closure member 168. As in the earlier embodiment of FIG. 10 et seq., the bucket receives liquid from the tank 184 when the liquid level is above a design level. The arrangement in that respect can be similar to what is shown in FIG. 10 et seq.

Assuming the sliding friction of the slide gate or knife gate is very small, one inherent benefit of the slide gate or knife gate is that the hydraulic pressure on the gate does not play a large part in the balancing equation for forces acting on the gate. Linear or non-linear springs can be employed to ensure sufficient force to close the gate. It would be technically possible to provide an appropriate form of varying counterweight system to accomplish the same purpose as springs, but springs allow for a simpler mechanism.

The knife gate 166 in the closed position will be balanced when the weight of the gate, along with any provided spring force, will tend to push the knife gate toward the closed position (even though it is closed). The downward force must be sufficient, near closure, to ensure the gate can overcome static friction and push the gate to fully closed. As liquid flow is introduced into the system, the liquid level in the basin or tank will increase, which will allow liquid from the clarifier or tank to spill over from a spillway (not shown, but as above) into the bucket 174, which has the opening 176. The system is designed so that the bucket will fill up faster than it leaks in conditions where the liquid in the clarifier or tank has exceeded design level by a sufficient amount. To open the gate, the liquid level in the bucket has to build up until the force/weight of the bucket is large enough to overcome the closing forces plus static friction on the gate. When that point is reached, the gate will open until the spring compresses enough to overcome the forces created by the weight in the bucket, or in the absence of springs, until the basin level fills sufficiently that inflow of liquid to the bucket slows to the point that liquid level in the bucket falls enough that no net opening force on the gate remains. One or more tension springs could be used rather than compression springs, with the same effect. When the gate stops in the open position, it will need to overcome static friction again to move in either direction, downward or upward. Because of the friction involved, even if minimized, the gate will "jump" from one position to another rather than smoothly finding equilibrium as in the hinged-flap designs discussed above. The more friction in the system, the more "jump" will occur.

As in the embodiments described above, the cable and pulley actuation system could be replaced with levers, gearing or other mechanisms. Such mechanisms could be used to multiply the effect of the bucket's movement, thus requiring less vertical bucket displacement space, but the effect of the bucket's weight is also diminished by an equivalent amount, requiring a larger bucket.

It should also be understood that the flap gates described above can take other forms, such as a butterfly valve, ball valve, diaphragm valve or globe valve, movable weir gate, with appropriate biasing toward the closed position. Biasing for such valves will typically be with springs, and actuation can be by leaky bucket, float or other mechanical arrangements described above. Butterfly valves, in particular, are often produced in large sizes. A rotor shaft of such a valve could be connected to an arm or a gear or sprocket, for example, connected to an actuator to urge the valve toward opening, while a spring urges the valve toward closure. Pressure behind the closed butterfly valve will not tend to urge the valve open, which can be advantageous. The same concept can be used for ball valve design. The globe valve, diaphragm valve and weir gate are vertically opening and closing and use similar mechanics to the knife gate of FIG. 19. The term "gate" as used herein and in the claims is to be understood as including flap gates, other types of gates, and valves.

The above implementations of the invention are illustrated as controlling outflow from a basin. The control systems can also be used for inflow. An inflow version would be a similar apparatus used to control the liquid level downstream of the liquid level control device, i.e. controlling the inflow to a basin. As the downstream basins liquid level increases above design liquid level, the actuator (float or leaky bucket) produces an increasing closing force to push the gate/valve toward closed allowing less liquid to enter the downstream basin. Thus, the actuating device would act in opposite manner as the "outflow" version. If the basin level drops below design level the actuator will open the gate to admit more liquid. This would be useful to prevent the downstream basin liquid level from rising or lowering without affecting the downstream processes. The inflow implementation would not involve a headloss device or element.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A liquid level control system to control liquid level in a basin without electrical components, wherein a midstream headloss inducing device creates a non-linear relationship between the liquid level in the basin to be controlled and a lesser downstream liquid level, the liquid level control system comprising:

a gate at an exit of the midstream headloss inducing device, with closure means urging the gate toward closure, an actuator device responsive to an increase in liquid level in the basin above a design level, connected to the gate to urge the gate open, overcoming the closure means, when the liquid level in the basin is above design level, and means associated with the actuator device for controlling timing and speed of opening and closing movements of the gate and for reaching a point of equilibrium of gate opening and closing forces while liquid flows out of the basin through the headloss device and through the gate, for smooth transitions of flow out of the gate, whereby liquid level changes in the basin are minimized, without sudden surges out the gate and without sudden closures of the gate.

2. The liquid level control system of claim 1, wherein with greater differences of basin liquid level above design level the actuator device causes greater gate-opening force.

3. The liquid level control system of claim 1, wherein the gate is a flap gate, with a flap on a horizontal hinge axis, the counterweight being attached to the flap.

4. The liquid level control system of claim 1, wherein the actuator device includes a suspended bucket or container which receives a flow of basin liquid when basin liquid is above design level, the bucket or container having an opening for outflow of liquid from the bucket or container, so that inflow to the bucket or container greater than outflow from the bucket or container will increase weight of the bucket or container, the bucket or container being connected mechanically to the gate to urge the gate open, whereby high inflows of liquid to the bucket or container tend to open the gate to an increasing degree to allow a greater release of liquid from the midstream headloss inducing device, until the inflow to the bucket or container is less than outflow from the bucket or container, ultimately allowing the gate to move toward closure.

5. The liquid level control system of claim 1, wherein the midstream headloss inducing device comprises a submerged effluent launder in a clarifier of a wastewater treatment basin.

6. The liquid level control system of claim 1, wherein the closure means includes a counterforce connected to the gate, the counterforce being effective to apply a maximum closing force on the gate when the gate is closed, and a lesser closing force as the gate continues to open farther.

7. The liquid level control system of claim 1, wherein the closure means comprises a spring.

8. The liquid level control system of claim 1, wherein the gate comprises a knife gate movable in a vertical direction upwardly from a bottom closed position.

9. The liquid level control system of claim 8, the actuator device includes a suspended bucket or container which receives a flow of basin liquid when basin liquid is above design level, the bucket or container having an opening for outflow of liquid from the bucket or container, so that inflow to the bucket or container greater than outflow from the bucket or container will increase weight of the bucket or container, the bucket or container being connected mechanically to the gate to urge the gate open, whereby high inflows of liquid to the bucket or container tend to open the gate to an increasing degree to allow greater release of liquid from the midstream headloss inducing device, until the inflow to the bucket or container is less than outflow from the bucket or container, ultimately allowing the gate to move toward closure.

10. The liquid level control system of claim 1, wherein the actuator device includes a float that floats in liquid maintained at the liquid level in the basin, the float being connected to apply opening force to the gate as basin liquid level rises above design level.

11. The liquid level control system of claim 10, wherein the gate comprises a flap gate with a flap on a horizontal hinge axis, the float being connected to apply lift to the flap as liquid level rises in the basin.

12. The liquid level control system of claim 11, wherein said closure means includes a counterforce connected to the gate and urging the gate toward closure in at least a portion of travel of the gate.

13. The liquid level control system of claim 1, wherein the closure means includes a counterforce connected to the gate and urging the gate toward closure in at least a portion of travel of the gate.

14. The liquid level control system of claim 13, wherein the gate is a flap gate, with a flap on a horizontal hinge axis, the counterforce being attached to the flap.

15. The liquid level control system of claim 14, wherein the counterforce comprises a roller weight movable on a strategically calculated non-linear shaped track connected to the flap and positioned to move the counterforce to account for non-linear headloss, reaching equilibrium at all flowrates with desired gate degrees of opening, movement of the roller weight being essentially in a plane perpendicular to the hinge axis.

16. The liquid level control system of claim 14, wherein the counterforce comprises a lever fixed to and extending generally upwardly from the gate flap and supporting a weight at an upper end, such that the weight produces greatest closing moment on the flap when the flap is closed, and lesser closing moment as the flap opens farther.

17. The liquid level control system of claim 14, wherein the counterforce comprises a counterweight that changes position with varying distance from the hinge of the flap as the gate opens, so that closing moment imposed by the counterweight is greatest near flap closure and is less as the gate opens farther.

18. A liquid level control system to control liquid level in a basin without electrical components, wherein a midstream headloss inducing device creates a non-linear relationship between an upstream basin liquid level to be controlled and a lesser downstream liquid level, the liquid level control system comprising:
  a gate at an exit of the midstream headloss inducing device, with closure means urging the gate toward closure,
  an actuator device responsive to an increase in liquid level in the basin above a design level, connected to the gate to urge the gate open, overcoming the closure means, when the liquid level in the basin is above design level, and
  control means associated with the actuator device for controlling timing and speed of opening and closing movements of the gate for liquid flowing out of the basin through the headloss device and through the gate.

19. The liquid level control system of claim 18, wherein said closure means includes a counterweight connected to the gate and urging the gate toward closure, the gate being a flap gate, with a flap on a horizontal hinge axis, the counterweight being attached to the flap.

20. The liquid level control system of claim 19, wherein the control means includes a tiltable flushing bucket on a horizontal pivot axis, receiving a flow of liquid from the basin when the liquid level in the basin is above design level, and the tiltable flushing bucket having a normal upright position and being balanced at the pivot axis such that when filled with liquid past a selected point, the tiltable flushing bucket tips from the normal upright position so as to dump most of the liquid out of the bucket, the tiltable flushing bucket being attached by linkage to the flap gate such that when the tiltable flushing bucket tips downwardly to dump liquid, the flap gate is opened, but is closed again after the tiltable flushing bucket has dumped liquid and has returned to a normal upright position whereby the linkage allows the flap gate to close under the influence of the counterweight.

21. The liquid level control system of claim 20, wherein the tiltable flushing bucket is positioned to dump liquid to a location downstream of the flap gate.

22. The liquid level control system of claim 20, wherein the tiltable flushing bucket discharges to a discharge area with an exit opening, and wherein duration and frequency of flushing can be adjusted by adjusting size of the exit opening.

23. The liquid level control system of claim 20, wherein the tiltable flushing bucket dumps liquid through an opening in the bucket, so as to control duration and frequency of flushes.

24. A liquid level control system to control liquid level in a basin through which liquid in a flow path enters and exits the basin, the liquid level control system comprising:
- a gate in the flow path, with positions between open and closed,
- an actuator device responsive to an increase in liquid level in the basin above a design level, connected to the gate to change gate positions when the liquid level in the basin is above design level, and
- means associated with the actuator device for controlling timing and speed of closing and opening movements of gate positions and for reaching a point of equilibrium of gate opening and closing forces, for smooth transitions of flow through the gate, the actuator device including a suspended bucket or container which receives an overflow of basin liquid when basin liquid is above design level, the bucket or container having an opening for outflow of liquid from the bucket or container, so that inflow to the bucket or container greater than outflow from the bucket or container will increase weight of the bucket or container, the bucket or container being connected mechanically to the gate to control the position of the gate, whereby high inflows of liquid to the bucket or container tend to move the gate in a direction to reverse an increase in liquid level, by changing the gate position in one direction, until the inflow to the bucket or container is less than outflow from the bucket or container, at which point the weight of the bucket or container decreases to change the gate position in an opposite direction,
- whereby liquid level changes in the basin are minimized, without sudden surges through the gate and without sudden closures of the gate.

* * * * *